(12) United States Patent
Does

(10) Patent No.: US 10,696,191 B2
(45) Date of Patent: Jun. 30, 2020

(54) PULL ACTUATOR RELEASE FOR RECLINING SEATS

(71) Applicant: Safran Seats USA LLC, Gainesville, TX (US)

(72) Inventor: Sebastiaan Does, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/773,043

(22) PCT Filed: Jun. 7, 2016

(86) PCT No.: PCT/US2016/036243
§ 371 (c)(1),
(2) Date: May 2, 2018

(87) PCT Pub. No.: WO2017/078795
PCT Pub. Date: May 11, 2017

(65) Prior Publication Data
US 2018/0312084 A1    Nov. 1, 2018

Related U.S. Application Data

(60) Provisional application No. 62/250,062, filed on Nov. 3, 2015.

(51) Int. Cl.
*B60N 2/22* (2006.01)
*B64D 11/06* (2006.01)
(Continued)

(52) U.S. Cl.
CPC ............. *B60N 2/22* (2013.01); *B60N 2/20* (2013.01); *B60N 2/23* (2013.01); *B60N 2/79* (2018.02);
(Continued)

(58) Field of Classification Search
CPC ... B60N 2/22; B60N 2/79; B60N 2/20; B60N 2/23; B60N 2002/0272; B64D 11/064; F16C 1/12; F16H 21/44; Y02T 50/46
See application file for complete search history.

(56) References Cited

U.S. PATENT DOCUMENTS 3,730,019 A * 5/1973 Ballard ............... F16C 1/18
                                              74/502
4,354,398 A * 10/1982 Porter ............... B60N 2/231
                                              403/155
(Continued)

FOREIGN PATENT DOCUMENTS

EP    0208127     1/1987
GB    2030258     4/1980
WO    2012135250  10/2012

OTHER PUBLICATIONS

International Patent Application No. PCT/US2016/036243, International Search Report and Written Opinion, dated Sep. 19, 2016.
(Continued)

*Primary Examiner* — Philip F Gabler
(74) *Attorney, Agent, or Firm* — Kilpatrick Townsend & Stockton LLP

(57) ABSTRACT

Seat assemblies including a substantially perpendicular pull actuator release are described. The seat assemblies can include a seat and a seat recline mechanism. The seat can include a back portion and a seat pan. The seat recline mechanism can include a gas spring, a control cable, an actuator, a frame, and a lever. The gas spring can include a release mechanism. The actuator can couple to a first end of the control cable. The lever can include a pivot location, a first arm, and a second arm. The first arm can couple to the second end of the control cable. The lever can respond to a pulling force exerted by the actuator on the control cable by rotating about the pivot location such that the second arm
(Continued)

engages the release mechanism of the gas spring to allow the back portion to rotate relative to the seat pan.

17 Claims, 6 Drawing Sheets

(51) Int. Cl.
    *B60N 2/23*     (2006.01)
    *B60N 2/75*     (2018.01)
    *B60N 2/20*     (2006.01)
    *F16C 1/12*     (2006.01)
    *F16H 21/44*     (2006.01)
    *B60N 2/02*     (2006.01)

(52) U.S. Cl.
    CPC .............. *B64D 11/064* (2014.12); *F16C 1/12* (2013.01); *F16H 21/44* (2013.01); *B60N 2002/0272* (2013.01); *Y02T 50/46* (2013.01)

(56) References Cited

U.S. PATENT DOCUMENTS

| | | | |
|---|---|---|---|
| 4,901,594 A | 2/1990 | Selzer | |
| 5,029,822 A | 7/1991 | Selzer | |
| 6,279,416 B1* | 8/2001 | Bucholtz | F16C 1/12 |
| | | | 74/501.5 H |
| 8,439,435 B2* | 5/2013 | Gaither | B60N 2/242 |
| | | | 297/118 |
| 8,733,840 B2* | 5/2014 | Westerink | B60N 2/1625 |
| | | | 297/316 |
| 9,492,013 B2* | 11/2016 | Battey | A47C 1/032 |
| 9,789,964 B2* | 10/2017 | Garing | B64D 11/0639 |

OTHER PUBLICATIONS

ITT Enidine Inc., UltraLOC Seat Recline Systems datasheet, New York, New York, https://www.enidine-aviation.com/Products/UltraLOC%e2%84%a2-Airline-Seat-Recline-Products/.

Europe Patent Application No. 16732085.2, Communication pursuant to Article 94(3) EPC (Office Action), dated May 17, 2019.

* cited by examiner

PULL ACTUATOR RELEASE FOR RECLINING SEATS

CROSS REFERENCE TO RELATED APPLICATIONS

This application is related to and claims priority benefits from U.S. Provisional Application Ser. No. 62/250,062 ("the '062 application"), filed on Nov. 3, 2015, entitled "Perpendicular Pull Actuator Release." The '062 application is hereby incorporated in its entirety by this reference.

FIELD OF THE INVENTION

The field of the invention relates to reclining seats. More specifically, but not by way of limitation, the field of the invention relates to a substantially perpendicular pull actuator release for reclining aircraft seats.

BACKGROUND

A passenger aircraft can include rows of reclinable seats for passengers. Each seat may include a gas spring that can facilitate reclining the seat. A gas spring can include a release mechanism that unlocks the gas spring. The release mechanism may be depressed to allow the gas spring to expand and contract freely. Therefore, depressing the release mechanism can allow the seat to be reclined to a desired position and freeing the release mechanism can lock the seat at the desired position.

An actuator can be used to cause the release mechanism to be engaged and allow the seat to recline. For example, the actuator may be a button that can be depressed to cause a pulling force to be applied to a cable. The cable can be coupled to a lever such that the lever is rotated, thereby causing a plunger coupled to the lever to depress the release mechanism. The lever can be coupled to a frame and the cable may coil around the frame such that the cable couples to the lever substantially parallel to the longitudinal axis of the gas spring and release mechanism. The coil in the cable can increase the total length of the cable, which can add resistance to the button and can increase the total weight of the cable.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments of the present invention, a seat assembly can include a seat and a seat recline mechanism. The seat can include a seat pan and a back portion. The seat recline mechanism can include a gas spring, a control cable, an actuator, a frame, and a lever. The gas spring can include a release mechanism. A first part of the gas spring can be coupled to the back portion of the seat, and a second portion of the gas spring can be coupled to the seat pan. The control cable can include a first end and a second end. The actuator can be coupled to the first end of the control cable. The frame can include an opening in a section of the frame, and the opening can house a portion of the release mechanism. The lever can include a pivot location coupled to the frame. The lever can further include a first arm extending from the pivot location. The first arm can be coupled to the second end of the control cable. The lever can further include a second arm extending from the pivot location. An angle $\alpha$ can be formed between the first arm and the second arm with the pivot location forming a vertex of the angle $\alpha$. The lever can respond to a pulling force exerted by the actuator on the first end of the of the control cable, by rotating about the pivot location toward the frame. The lever can rotate such that the second arm of the lever engages the release mechanism of the gas spring, which can allow the back portion to rotate relative to the seat pan.

In some embodiments, the seat can be a passenger seat on a passenger aircraft, and the actuator can include a button on an armrest of the passenger seat for applying the pulling force to the first end of the control cable when depressed.

In some embodiments, the second end of the control cable can be arranged substantially perpendicular to a longitudinal axis of the gas spring.

In some embodiments, the second end of the control cable can be arranged substantially parallel to the section of the frame.

In some embodiments, the section of the frame is a first section, the opening in the first section is a first opening, and the frame can include a second section substantially perpendicular to the first section with a second opening for allowing a segment of the control cable to pass therethrough.

In some embodiments, the seat recline mechanism can further include a sleeve, and a biasing mechanism. The sleeve can house the control cable, and the sleeve can extend from the second section of the frame to the actuator. The biasing mechanism can be coupled to the second arm for biasing the lever to a position such that the gas spring can prevent the back portion from rotating relative to the seat pan.

In some embodiments, the first arm can respond to the pulling force by rotating along a first arc substantially perpendicular to a longitudinal axis of the release mechanism, and the second arm can respond to the pulling force by rotating along a second arc substantially parallel to the longitudinal axis of the release mechanism.

In some embodiments, the pulling force can cause between 10° and 30° of rotation on the lever relative to the pivot location.

In some embodiments, the control cable can extend from the frame to the actuator without coiling around the frame.

According to certain embodiments of the present invention, a device can include a frame and a lever. A section of the frame can include an opening. The opening can be for housing a release mechanism of a gas spring with a first part of the gas spring coupled to a back portion of a seat and a second part coupled to a seat pan of the seat. The lever can be coupled to the frame at a pivot point, biased to a first position, and include a first arm and a second arm. The first arm can extend from the pivot location and be couplable to an end of a control cable. The first arm can respond to a pulling force applied to the control cable by causing the lever to rotate about the pivot location to a second position. The second arm can extend from the pivot location to form an angle α between the first arm and the second arm with the pivot location forming a vertex of the angle α. The second arm can, in the second position, apply a depressing force to the release mechanism of the gas spring to allow the back portion to rotate relative to the seat pan.

In some embodiments, the first arm can respond to the pulling force by rotating substantially side-to-side in relation to the aircraft, and the second arm can respond to the pulling force by rotating substantially aft-to-forward in relation to the aircraft.

In some embodiments, the device further includes a spring coupled to the second arm for biasing the lever to the first position, and the angle α is between 45° and 135°.

According to certain embodiments of the present invention, a method can include applying a pulling force to a first end of a control cable with a second end of the control cable coupled to a first arm of a lever. The method can further include rotating the lever about a pivot location such that a second arm of the lever, substantially perpendicular to the first arm, applies a depressive force to a release mechanism of a gas spring that can be coupled to a back portion of a seat and a seat pan of the seat. The method can further include allowing the back portion to rotate relative to the seat pan due to the depressive force applied by the second arm to the release mechanism.

In some embodiments, rotating the lever about the pivot location includes rotating the lever toward a frame with an opening in a first section for housing the release mechanism. In addition, the method further includes applying the pulling force includes pulling the control cable through a second opening in a second section of the frame that is substantially perpendicular to the first section.

In some embodiments, the seat can be a passenger seat on an aircraft. In addition, applying the pulling force can further include depressing a button on an armrest of the passenger seat to pull the control cable through a sleeve that extends from the button to the second opening.

DETAILED DESCRIPTION

Figure 1:
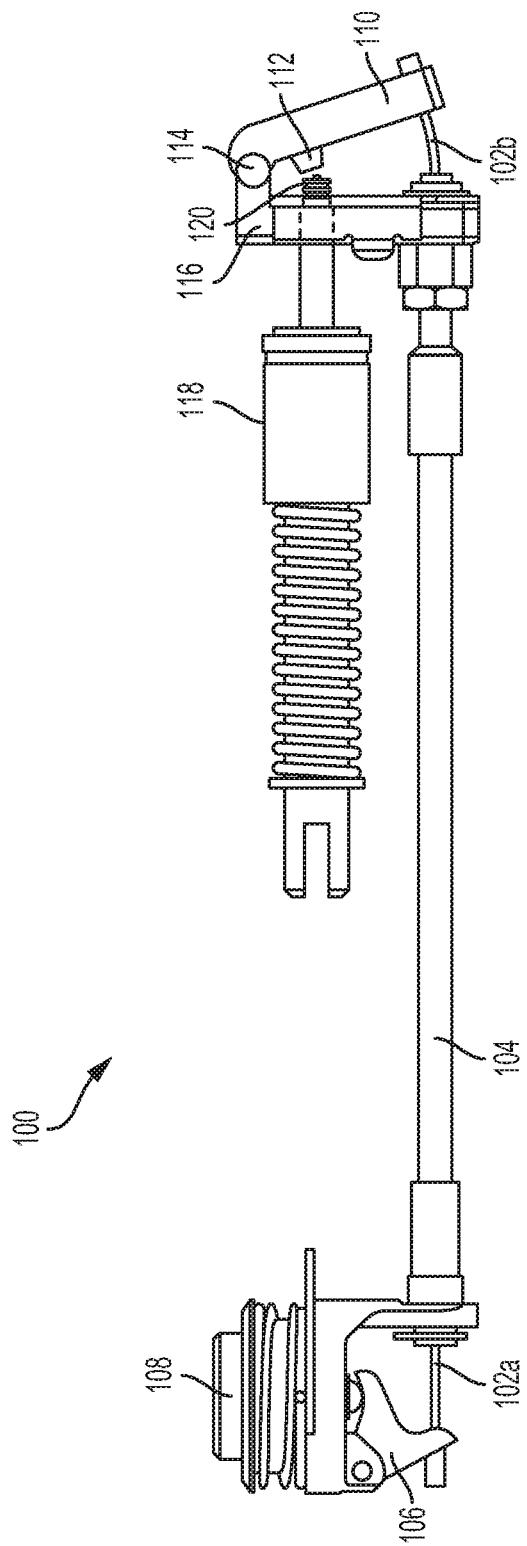
FIG. 1 is a side view of a parallel pull actuator release, according to the prior art.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In some embodiments, the substantially perpendicular pull actuator release can be used with aircraft seats, but is by no means limited to aircraft seats. Rather, embodiments of the substantially perpendicular pull actuator release may be used in passenger seats or other seats of any type or otherwise as desired.

Furthermore, the term "perpendicular" and "substantially perpendicular" as used herein are intended to refer broadly to all angles that are not substantially parallel. Statements containing these terms should be understood not to limit the subject matter described herein or to limit the meaning or scope of the patent claims below to exactly 90°. For example, angles that are closer to perpendicular than parallel (e.g., angles from 45°-135°, 60°-120°, and 70°-110°) should be considered substantially perpendicular.

According to certain embodiments of the present invention, as shown in FIGS. 2-6, a seat assembly 200 can include a substantially perpendicular pull actuator release 210, a sleeve 220 housing a control cable 312, an actuator 230, a seat 240, and a gas spring 320. The seat 240 can include a seat pan 242 and a back portion 244. The actuator 230 can include a button 332. The substantially perpendicular pull actuator release 210 can include a lever 302 with a first arm 304 and a second arm 306, a spring 308, and a frame 316. The frame 316 can include a first opening 516 and a second opening 518. The gas spring 320 can include a release mechanism 420 positionable in the second opening 518.

FIG. 1 illustrates a side view of a seat assembly 100 with a parallel pull actuator release according to the prior art. The seat assembly 100 includes a cable with a first end 102a and a second end 102b housed by a sleeve 104. The first end 102a is coupled to an actuator 106 that is coupled to a button 108 such that depressing the button 108 causes a pulling force to be applied to the first end 102a. The second end 102b passes through an opening in frame 116 and couples to lever 110. Lever 110 is coupled to the frame 116 at pivot location 114, and includes a plunger 112. The lever 110 can respond to the pulling force applied to the first end 102a by rotating about the pivot location 114 toward the frame 116.

The frame 116 includes another opening that houses a portion of release mechanism 120 of a gas spring 118. In some embodiments, both openings in the frame 116 are in the same section of the frame 116. The longitudinal axis of the gas spring 118 and the release mechanism 120 are substantially parallel to the second end 102b. The lever 110 includes a single arm that can rotate in response to the pulling force such that the plunger 112 contacts the release mechanism causing the gas spring to unlock.

Figure 2:
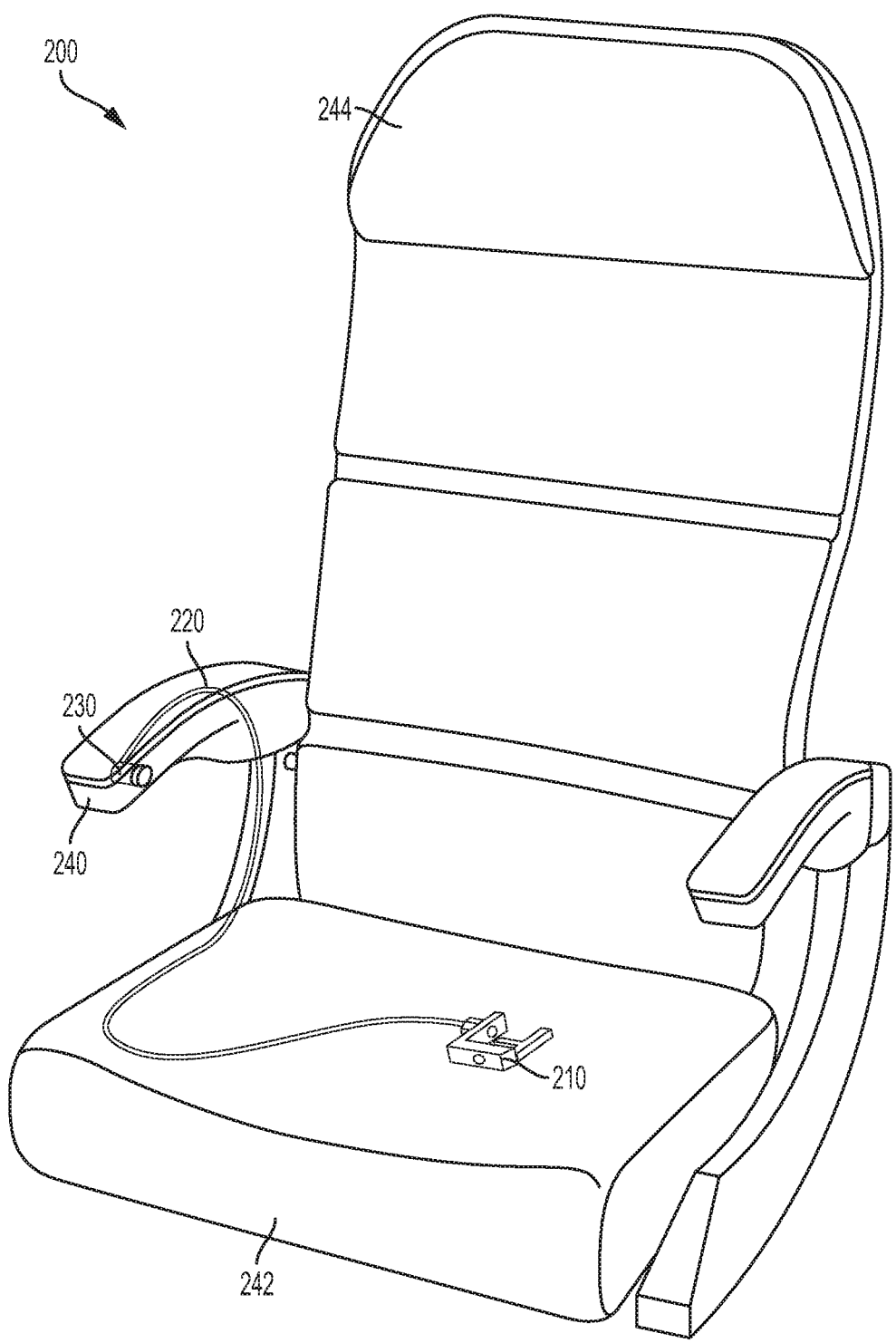
FIG. 2 is a perspective view of a seat assembly with a perpendicular pull actuator release, according to certain embodiments of the present invention.

FIG. 2 illustrates a perspective view of the seat assembly 200 including the passenger seat 240 with the substantially perpendicular pull actuator release ("release") 210. The passenger seat 240 can include the seat pan 242 and the back portion 244. The release 210 can be coupled to the gas spring 320 (not illustrated in FIG. 2) that can allow the back portion 244 to rotate relative to the seat pan 242 while the gas spring 320 is unlocked and prevent the rotation while the gas spring 320 is locked. The release mechanism 420 (not illustrated in FIG. 2) for unlocking the gas spring 320 can be actuated by the release 210.

The sleeve 220 can extend from the release 210 to an actuator 230. The sleeve 220 can house the control cable 312 with a first end coupled to first arm 304 of the lever 302 in the release 210 and a second end coupled to the actuator 230, such that, when actuator 230 is depressed, a pulling force is applied to the control cable 312 that induces a rotational force on the lever 302. The release 210 can respond to the rotational force on the lever 302 by rotating and causing the second arm 306 to apply a depressive force to the release mechanism 420. The depressive force can actuate the release mechanism 420, unlock the gas spring 320, and allow the back portion 244 to rotate relative to the seat pan 242. In some examples, the end of the control cable 312 coupled to the first arm 304 of the lever 302 can be arranged substantially perpendicular to the longitudinal axis of the gas spring 320.

As illustrated in FIG. 2, the sleeve 220 housing the control cable 312 can extend from the portion of the release 210 closest to the actuator 230, such that the control cable 312 does not coil around the release 210. In some examples, using the release 210 can allow for reducing a length of the control cable 312 by approximately eighteen inches. The reduction in control cable 312 length can reduce the total weight of the seat assembly 200. In some examples, the reduction in control cable 312 length can reduce the total weight of the control cable 312 by 20%. The reduction in control cable 312 length can also reduce the resistance of the actuator 230 by reducing the amount of pulling force required to rotate the lever 302. In some examples, the amount of pulling force required to rotate the lever 302 can be reduced by 35% due to a reduction in length of control cable 312. Although FIG. 2 illustrates actuator 230 as the button 332 for pulling the control cable 312, any device that responds to a stimulus by pulling on the control cable 312 may be used. For example, a ratcheting gear can be activated to pull the control cable 312.

An example seat assembly 200 may be formed of materials including but not limited to aluminum, stainless steel, aramid fibers, other metallic materials, composite materials, plastics (e.g., polycarbonate and polypropylene), or other suitable materials. In some aspects, the seat assembly 200 may be manufactured as a single component. In additional or alternative aspects, individual components may be coupled via suitable fasteners, which include but are not limited to screws, bolts, rivets or other mechanical or chemical fasteners.

Figure 3:
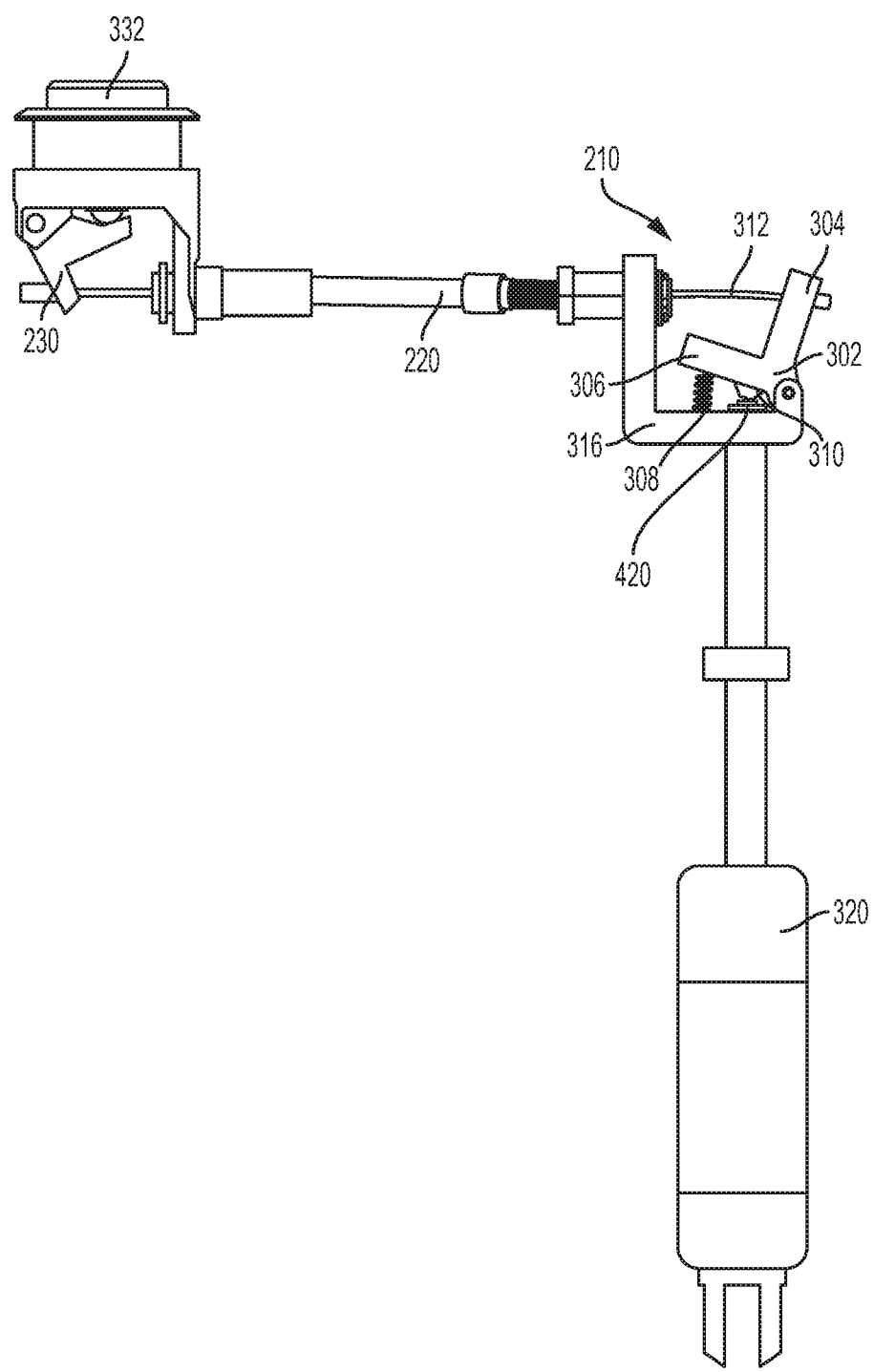
FIG. 3 is a perspective view of a perpendicular pull actuator release coupled to a gas spring and an actuator, according to certain embodiments of the present invention.

FIG. 3 illustrates the release 210 coupled to the gas spring 320 and an actuator 230. The release 210 can include the lever 302 with the first arm 304 and the second arm 306. An angle α can be formed between the first arm 304 and the second arm 306. The first arm 304 and second arm 306 can extend from a pivot location of the lever 302 that forms the vertex of the angle α. In some examples, the angle α can be between 45° and 135°.

The first arm 304 can be coupled to the control cable 312. The control cable 312 can extend from the first arm 304 through the first opening 516 in the first section of frame 316 to the actuator 230. The sleeve 220 can house a portion of the control cable 312 between the release 210 and the actuator 230. The second arm 306 can include a plunger 310 for interacting with the release mechanism 420 associated with the gas spring 320. A second section of frame 316 can be substantially perpendicular to the first section of frame 316 and can include the second opening 518 therein. The release mechanism 420 can be partially housed by the second opening 518 in the frame 316.

Figure 4:
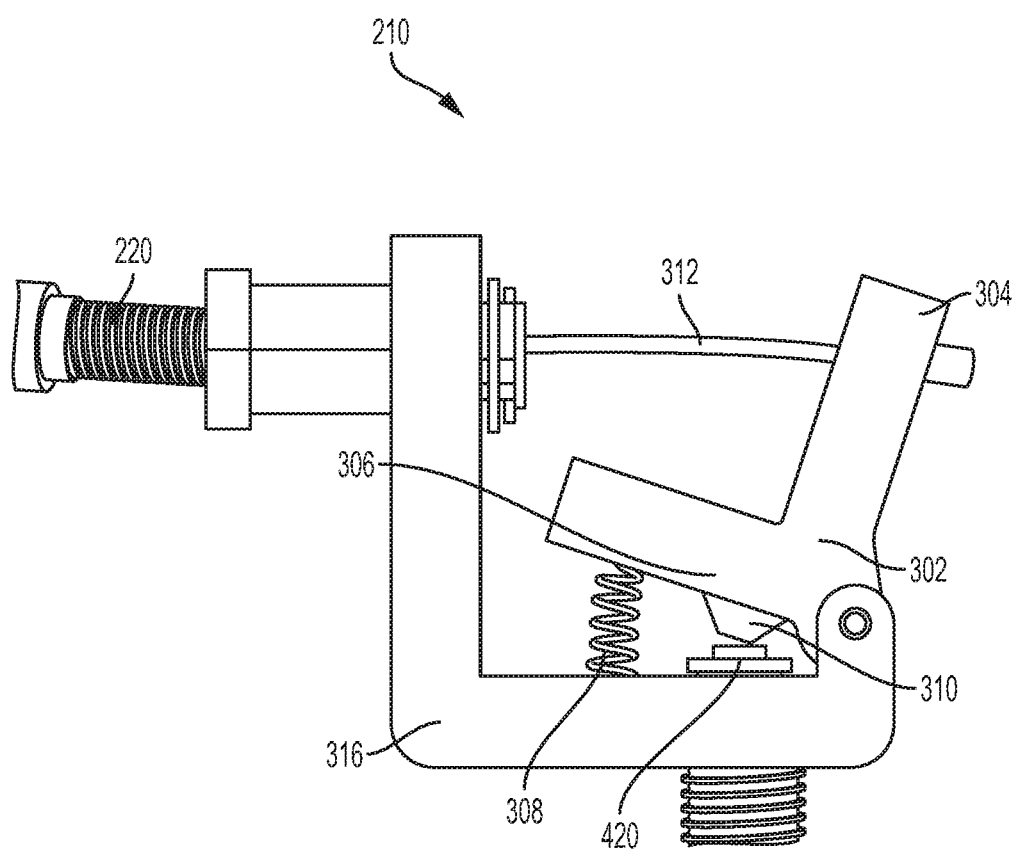
FIG. 4 is a perspective view of a perpendicular pull actuator release in an open position, according to certain embodiments of the present invention.
Figure 6:
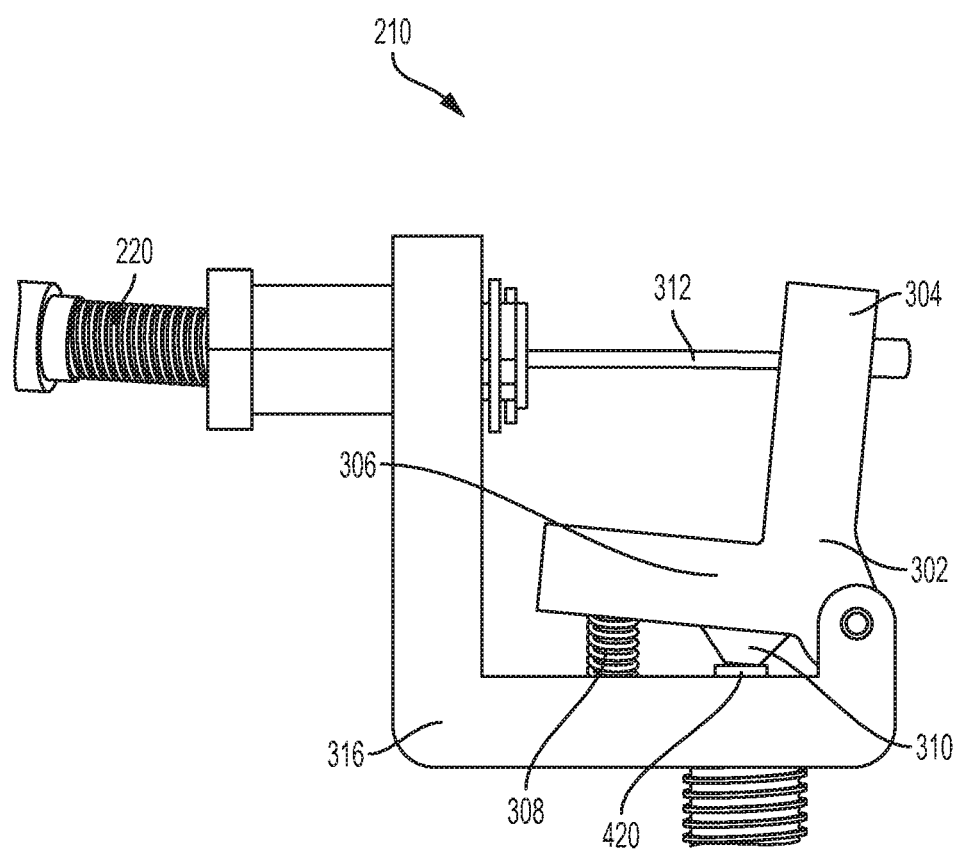
FIG. 6 is a perspective view of a perpendicular pull actuator release in a closed position, according to certain embodiments of the present invention.

The lever 302 may be biased to a first position, as illustrated in FIGS. 2-4, by the spring 308. In the first position, the plunger 310 can avoid contact with the release mechanism 420 such that the gas spring 320 can remain locked. While the gas spring 320 is locked, the back portion 244 of an associated seat 240 may be prevented from moving. The lever 302 may be moved to a second position, as illustrated in FIG. 6, due to the control cable 312 being pulled through the sleeve 220. In some examples, the button 332 can be coupled to the actuator 230 such that when the button 332 is depressed, the pulling force is applied to the control cable 312. The control cable 312 can apply the force to the first arm 304 that overcomes the bias of the spring 308 and causes the lever 302 to rotate to the second position. In some examples, the control cable 312 can apply approximately two pounds of force to the first arm 304 to overcome the bias of the spring 308. In some examples, the lever 302 may rotate between 15° and 45° about the pivot location. In the second position, the plunger 310 applies the depressive force to the release mechanism 420 causing the gas spring 320 to unlock. In some examples, the depressive force applied to the release mechanism 420 is substantially perpendicular to the force applied to the first arm 304.

FIG. 4 illustrates the release 210 biased to the first position by spring 308. In the first position, the spring 308 applies the force to the second arm 306 that keeps the plunger 310 from contacting release mechanism 420. The control cable 312 can be coupled to the first arm 304 and extend through the sleeve 220. In some examples, the cable may be loose, such that the cable does not apply the force to the first arm 304.

In some aspects, the sleeve 220 and control cable 312 are made from the same material. In additional or alternative aspects, the sleeve 220 and control cable 312 are made from different materials including but not limited to aluminum, stainless steel, aramid fibers, other metallic materials, plastics (e.g., polycarbonate and polypropylene), composite materials, or other similar materials. The sleeve 220 is illustrated as coupled to the release 210 with a pair of nuts but the sleeve 220 may be attached with any suitable fastener, which include but are not limited to screws, bolts, rivets or other mechanical or chemical fasteners. FIG. 4 also illustrates a guiding washer on the opposite side of the opening from the nuts that can guide the control cable 312 through the opening and reduce wear.

Release mechanism 420 can be a depressible button associated with the gas spring 320 that responds to the depressible force by unlocking the gas spring 320. In some examples, the release mechanism 420 can be housed at least partially in an opening in the frame 316. In additional or alternative examples, the release mechanism 420 can be positionable external to the release 210 and the plunger 310 may extend through an opening in the frame 316 to apply pressure to the release mechanism 420. Although the plunger 310 is illustrated with a frustum shape, various shapes are possible. For example, the plunger 310 may have a width smaller than the opening in the frame 316, such that the plunger 310 can pass through a portion of the opening to contact the release mechanism 420. In additional or alternative examples, the second arm 306 can contact the release mechanism 420 directly.

Figure 5:
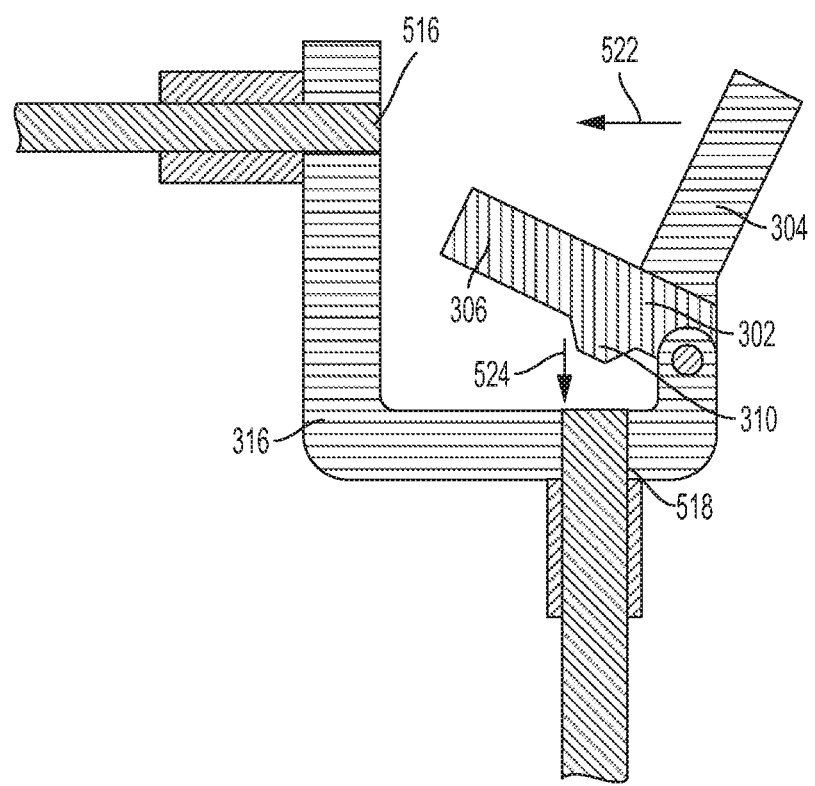
FIG. 5 is a cross-sectional view of a perpendicular pull actuator release in an open position, according to certain embodiments of the present invention.

FIG. 5 illustrates a cross-sectional view of the release 210 in the first position and a first force 522 that may be applied to the first arm 304 to cause the lever 302 to rotate from the first position to the second position. The first force 522 can be the pulling force applied by the control cable 312 (not illustrated in FIG. 5) that passes through the first opening 516 in the release 210. In some examples, the first force 522 can cause the lever 302 to rotate from the first position to the second position. In the second position, the plunger 310, coupled to the second arm 306, can apply the second force 524 to the release mechanism 420 (not illustrated in FIG. 5) at least partially housed in the second opening 518. In additional or alternative examples, the first arm 304 can respond to the pulling force by rotating along a first arc that is substantially perpendicular to a longitudinal axis of the release mechanism 420. In addition, the second arm 306 can respond to the pulling force by rotating along a second arc that is substantially parallel to the longitudinal axis of the release mechanism 420.

Passing the cable through the first opening 516 in frame 316 of the release 210 at an angle substantially perpendicular to the longitudinal axis of the release mechanism 420 can reduce the length of the cable. In some examples, the first opening 516 can be through a section of the frame 316 that is substantially perpendicular to a section with the second opening 518. This can allow the cable to be pulled by an actuator 230 through the first opening 516 and directly toward the device without coiling around the release 210. In additional or alternative aspects, the first force 522 can be substantially perpendicular to the second force 524. In additional or alternative aspects, the cable may be arranged substantially parallel to the section of the frame 316 with the second opening 518 therethrough.

In additional or alternative examples, the plunger 310 with a different size and shape may extend from the second arm 306. The lever 302 can rotate from the first position to the second position, such that the plunger 310 extends partially through the second opening 518. The second opening 518 may be aligned with the release mechanism 420, such that the plunger 310 can extend partially through the second opening 518 and actuate the release mechanism 420.

As illustrated in FIG. 6, the release 210 can be in the second position. In the second position, the release mechanism 420 may be depressed by the plunger 310. The plunger 310 may apply the depressive force to the release mechanism 420 because of the control cable 312 being pulled away from the first arm 304 and through the sleeve 220. The force applied by the plunger 310 may be substantially perpendicular to the force applied by the cable to the first arm 304. The force applied by the cable may be overcome by the bias of the spring 308 and the lever 302 may return to the first position.

In some examples, by depressing the release mechanism 420, the release mechanism 420 can unlock an associated gas spring 320. With the gas spring 320 unlocked, an associated back portion 244 of the seat 240 may be moved (e.g., inclined or reclined). In some examples, the control cable 312 may be released, thereby causing the force applied to the first arm 304 to be removed. And, the spring 308 may cause the lever 302 to return to the first position. In the first position, the force being applied by the plunger 310 to the release mechanism 420 may be removed. Releasing the release mechanism 420 can lock the gas spring 320 and prevent the associated back portion 244 from moving.

Some embodiments described herein can include the release 210 that actuates the recline feature for passenger seats 240. The release 210 can reduce the length of control cable 312 used in unlocking the gas spring 320 that facilitates the reclining feature for the passenger seat 240. The release 210 can reduce the total length of control cable 312 by preventing the control cable 312 from coiling around the release 210. Reducing the length of control cable 312 can reduce the total weight of the seat assembly 200 and reduce the force needed to actuate the recline feature.

An example release 210 can comprise the frame 316 and the lever 302. An example frame 316 may have an L shape with the first opening 516 through a vertical portion of the frame 316 and second opening 518 through a horizontal portion, such that the first opening 516 is substantially perpendicular to the second opening 518. An example lever 302 may have the first arm 304 and the second arm 306 that form an L shape. The lever 302 may pivotably couple to the frame 316 at the junction between the first arm 304 and the second arm 306. The second arm 306 may include the plunger 310 with a width smaller than the second opening 518, such that the plunger 310 can pass at least partially through the second opening 518. The plunger 310 may have a frustum shape, such that a portion extending farther from the second arm 306 may have a smaller width than a portion closer to the second arm 306. The lever 302 may be pivotable about the junction, such that, in a particular position, the plunger 310 can be housed by the second opening 518 in the frame 316.

In some examples, the release 210 may include the spring 308. The spring 308 may be coupled to the frame 316 and the second arm 306, such that the lever 302 is biased to a position in which the plunger 310 is external to the second opening 518. In additional or alternative examples, the control cable 312 may couple to the first arm 304, and a segment of the control cable 312 can extend through the first opening 516. The control cable 312 may be pulled to apply the force to the first arm 304 that overcomes the bias of the spring 308 and causes the lever 302 to rotate from the first position to the second position.

In some examples, the second arm 306 can engage the release mechanism 420 of the gas spring 320 while the lever 302 is in the second position. The gas spring 320 may be coupled to the frame 316 such that the longitudinal axis of the gas spring 320 is substantially perpendicular to the segment of the control cable 312 that extends through the first opening 516. While engaged, the release mechanism 420 can unlock the gas spring 320 and allow reclining functionality of an associated seat 240.

Although FIGS. 2-6 depict the release 210 that can unlock the gas spring 320 by applying a force to the release mechanism 420, other embodiments exist. In some examples, the release 210 can unlock the gas spring 320 by removing a force from the release mechanism 420. In additional or alternative examples, the release 210 may move from the first position to the second position in response to the control cable 312 being pushed toward the release 210.

In the following, further examples are described to facilitate the understanding of the invention:

Example #1

A seat assembly can include a seat and a seat recline mechanism. The seat can include a seat pan and a back portion. The seat recline mechanism can include a gas spring, a control cable, an actuator, a frame, and a lever. The gas spring can include a release mechanism. A first part of the gas spring can be coupled to the back portion of the seat and a second portion of the gas spring can be coupled to the seat pan. The control cable can include a first end and a second end. The actuator can be coupled to the first end of the control cable. The frame can include an opening in a section of the frame and the opening can house a portion of the release mechanism. The lever can include a pivot location coupled to the frame. The lever can further include a first arm extending from the pivot location. The first arm can be coupled to the second end of the control cable. The lever can further include a second arm extending from the pivot location. An angle α can be formed between the first arm and the second arm with the pivot location forming a vertex of the angle α. The lever can respond to a pulling force exerted by the actuator on the first end of the of the control cable, by rotating about the pivot location toward the frame. The lever can rotate such that the second arm of the lever engages the release mechanism of the gas spring, which can allow the back portion to rotate relative to the seat pan.

Example #2

The seat assembly of any of the preceding or subsequent examples, wherein the seat can be a passenger seat on a passenger aircraft, and the actuator can include a button on an armrest of the passenger seat for applying the pulling force to the first end of the control cable when depressed.

Example #3

The seat assembly of any of the preceding or subsequent examples, wherein the second end of the control cable can be arranged substantially perpendicular to a longitudinal axis of the gas spring.

Example #4

The seat assembly of any of the preceding or subsequent examples, wherein the second end of the control cable can be arranged substantially parallel to the section of the frame.

Example #5

The seat assembly of any of the preceding or subsequent examples, wherein the section of the frame is a first section, the opening in the first section is a first opening, and the frame can include a second section substantially perpendicular to the first section with a second opening for allowing a segment of the control cable to pass therethrough.

Example #6

The seat assembly of any of the preceding or subsequent examples, wherein the seat recline mechanism can further include a sleeve, and a biasing mechanism. The sleeve can house the control cable, and the sleeve can extend from the second section of the frame to the actuator. The biasing mechanism can be coupled to the second arm for biasing the lever to a position such that the gas spring can prevent the back portion from rotating relative to the seat pan.

Example #7

The seat assembly of any of the preceding or subsequent examples, wherein the angle α can be between 45° and 135°.

Example #8

The seat assembly of any of the preceding or subsequent examples, wherein the first arm can respond to the pulling force by rotating along a first arc substantially perpendicular to a longitudinal axis of the release mechanism, and the second arm can respond to the pulling force by rotating along a second arc substantially parallel to the longitudinal axis of the release mechanism.

Example #9

The seat assembly of any of the preceding or subsequent examples, wherein the pulling force can cause between 10° and 30° of rotation on the lever relative to the pivot location.

Example #10

The seat assembly of any of the preceding or subsequent examples, wherein the control cable can extend from the frame to the actuator without coiling around the frame.

Example #11

A device can include a frame and a lever. A section of the frame can include an opening. The opening can be for housing a release mechanism of a gas spring with a first part of the gas spring coupled to a back portion of a seat and a second part coupled to a seat pan of the seat. The lever can be coupled to the frame at a pivot point, biased to a first position, and include a first arm and a second arm. The first arm can extend from the pivot location and be couplable to an end of a control cable. The first arm can respond to a pulling force applied to the control cable by causing the lever to rotate about the pivot location to a second position. The second arm can extend from the pivot location to form an angle α between the first arm and the second arm with the pivot location forming a vertex of the angle α. The second arm can, in the second position, apply a depressing force to the release mechanism of the gas spring to allow the back portion to rotate relative to the seat pan.

Example #12

The device of any of the preceding or subsequent examples, wherein the seat can be a passenger seat on an aircraft, and the passenger seat can include an armrest with a button for pulling the control cable when depressed.

Example #13

The device of any of the preceding or subsequent examples, wherein the first arm can respond to the pulling force by rotating substantially side-to-side in relation to the aircraft, and the second arm can respond to the pulling force by rotating substantially aft-to-forward in relation to the aircraft.

Example #14

The device of any of the preceding or subsequent examples, wherein the end of the control cable can be arranged substantially perpendicular to a longitudinal axis of the gas spring.

Example #15

The device of any of the preceding or subsequent examples, wherein the end of the control cable can be arranged substantially parallel to the section of the frame.

Example #16

The device of any of the preceding or subsequent examples, wherein the section of the frame can be a first section, the opening in the first section can be a first opening, and the frame can include a second section substantially perpendicular to the first section with a second opening for allowing a segment of the control cable to pass therethrough.

Example #17

The device of any of the preceding or subsequent examples, wherein the device further includes a spring coupled to the second arm for biasing the lever to the first position, and the angle α is between 45° and 135°.

Example #18

A method can include applying a pulling force to a first end of a control cable with a second end of the control cable coupled to a first arm of a lever. The method can further include rotating the lever about a pivot location such that a second arm of the lever, substantially perpendicular to the first arm, applies a depressive force to a release mechanism of a gas spring that is coupled to a back portion of a seat and a seat pan of the seat. The method can further include allowing the back portion to rotate relative to the seat pan due to the depressive force applied by the second arm to the release mechanism.

Example #19

The method of any of the preceding or subsequent examples, wherein rotating the lever about the pivot location includes rotating the lever toward a frame with an opening in a first section for housing the release mechanism. And, the method further includes applying the pulling force includes pulling the control cable through a second opening in a second section of the frame that is substantially perpendicular to the first section.

Example #20

The method of any of the preceding or subsequent examples, wherein the seat can be a passenger seat on an aircraft. And, applying the pulling force can further include depressing a button on an armrest of the passenger seat to pull the control cable through a sleeve that extends from the button to the second opening.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat assembly comprising:
   a seat with a seat pan and back portion; and
   a seat recline mechanism comprising:
      a gas spring with a release mechanism, the gas spring including a first part coupled to the back portion of the seat and a second part coupled to the seat pan;
      a control cable with a first end and a second end;
      an actuator coupled to the first end of the control cable;
      a frame with an opening in a section of the frame, the opening for housing a portion of the release mechanism; and
      a lever with a pivot location coupled to the frame, and comprising:
         a first arm extending from the pivot location; and
         a second arm extending from the pivot location and forming an angle α between the first arm and the second arm with the pivot location forming a vertex of the angle α,
         a spring mechanism for biasing the lever, wherein the spring mechanism is coupled between the second arm and the frame,
         wherein the second end of the control cable is coupled to a portion of the first arm that is spaced apart from the second arm, and
         wherein the lever is configured to respond to a pulling force exerted by the actuator on the first end of the of the control cable by rotating about the pivot location toward the frame such that the second arm of the lever engages the release mechanism of the gas spring to allow the back portion to rotate relative to the seat pan.

2. The seat assembly of claim 1, wherein the seat is a passenger seat on a passenger aircraft, and the actuator includes a button on an armrest of the passenger seat for applying the pulling force to the first end of the control cable when depressed.

3. The seat assembly of claim 1, wherein the second end of the control cable is arranged substantially perpendicular to a longitudinal axis of the gas spring.

4. The seat assembly of claim 1, wherein the second end of the control cable is arranged substantially parallel to the section of the frame.

5. The seat assembly of claim 1, wherein the section of the frame is a first section, the opening in the first section is a first opening, and the frame includes a second section substantially perpendicular to the first section with a second opening for allowing a segment of the control cable to pass therethrough.

6. The seat assembly of claim 5, wherein the seat recline mechanism further comprises:
   a sleeve for housing the control cable, the sleeve extending from the second section of the frame to the actuator; and
   the spring mechanism is coupled at one end to the second arm of the lever such that the gas spring prevents the back portion from rotating relative to the seat pan.

7. The seat assembly of claim 1, wherein the angle α is between 45° and 135°.

8. The seat assembly of claim 1, wherein the first arm is for responding to the pulling force by rotating along a first arc substantially perpendicular to a longitudinal axis of the release mechanism, and the second arm is for responding to the pulling force by rotating along a second arc substantially parallel to the longitudinal axis of the release mechanism.

9. The seat assembly of claim 1, wherein the pulling force causes between 15° and 45° of rotation on the lever relative to the pivot location.

10. The seat assembly of claim 1, wherein the control cable extends from the frame to the actuator without coiling around the frame.

11. A device comprising:
    a frame comprising:
       a first section defining a first opening for housing a release mechanism of a gas spring;

a second section extending from the first section and defining a second opening for housing a portion of a control cable; and a third section extending from the first section and defining a pivot location; and a lever coupled to the frame at the pivot location and biased to a first orientation relative to the frame, and comprising:

a first arm extending in a first direction, wherein the first arm is couplable to an end of the control cable and configured to respond to a pulling force applied to the control cable by causing the lever to rotate about the pivot location to a second orientation relative to the frame; and a second arm extending from the first arm in a second direction, wherein an angle α is defined between the first arm and the second arm, and wherein, in the second orientation of the lever, the second arm is configured to apply a depressing force to the release mechanism of the gas spring to allow a back portion to rotate relative to a seat pan of a seat; and a spring mechanism for biasing the lever to the first orientation and positioned between the second section of the frame and the second arm of the lever.

12. The device of claim 11, wherein the seat is a passenger seat on an aircraft, and the passenger seat includes an armrest with a button for pulling the control cable when depressed.

13. The device of claim 12, wherein the first arm is for responding to the pulling force by rotating substantially side-to-side in relation to the aircraft, and the second arm is for responding to the pulling force by rotating substantially aft-to-forward in relation to the aircraft.

14. The device of claim 11, wherein the end of the control cable is arranged substantially perpendicular to a longitudinal axis of the gas spring.

15. The device of claim 11, wherein the end of the control cable is arranged substantially parallel to the first section of the frame.

16. The device of claim 11, wherein the second section is substantially perpendicular to the first section and the second opening allows for a segment of the control cable to pass therethrough.

17. The device of claim 11, wherein
the spring mechanism is coupled at a first end to the second arm of the lever and at a second end to the second section of the frame, and
wherein the angle α is between 45° and 135°.

* * * * *